(12) United States Patent
Shinagawa et al.

(10) Patent No.: US 12,286,289 B2
(45) Date of Patent: Apr. 29, 2025

(54) PACKING MATERIAL

(71) Applicant: FANUC CORPORATION, Minamitsuru-gun (JP)

(72) Inventors: Masahide Shinagawa, Yamanashi-ken (JP); Kousuke Imasaka, Yamanashi-ken (JP)

(73) Assignee: FANUC CORPORATION, Minamitsuru-gun (JP)

( * ) Notice: Subject to any disclaimer, the term of this patent is extended or adjusted under 35 U.S.C. 154(b) by 174 days.

(21) Appl. No.: 18/009,507

(22) PCT Filed: Jun. 7, 2021

(86) PCT No.: PCT/JP2021/021562
§ 371 (c)(1),
(2) Date: Dec. 9, 2022

(87) PCT Pub. No.: WO2021/251336
PCT Pub. Date: Dec. 16, 2021

(65) Prior Publication Data
US 2023/0219744 A1 Jul. 13, 2023

(30) Foreign Application Priority Data

Jun. 12, 2020 (JP) ................................. 2020-102278

(51) Int. Cl.
*B65D 5/50* (2006.01)
*B65D 81/02* (2006.01)
*B65D 81/113* (2006.01)
*B65D 85/68* (2006.01)

(52) U.S. Cl.
CPC ............. *B65D 85/68* (2013.01); *B65D 5/505* (2013.01); *B65D 5/5071* (2013.01); *B65D 81/022* (2013.01); *B65D 81/113* (2013.01); *B65D 2585/6897* (2013.01)

(58) Field of Classification Search
CPC .................... B65D 5/505; B65D 85/68; B65D 2585/6897; B65D 81/113; B65D 81/022
See application file for complete search history.

(56) References Cited

U.S. PATENT DOCUMENTS 4,792,043 A * 12/1988 Holladay ............... B65D 85/68
206/349

FOREIGN PATENT DOCUMENTS

| CN | 108045762 A | * | 5/2018 | ........... B65D 81/113 |
|----|-------------|---|--------|------------------------|
| JP | S 49-056669 U1 | | 5/1974 | |
| JP | H06-050149 Y | | 12/1994 | |
| JP | 2014-240292 A | | 12/2014 | |
| JP | 2014-240293 A | | 12/2014 | |

(Continued)

OTHER PUBLICATIONS

International Search Report (Isr) (PCT Form PCT/ISA/210), in PCT/JP2021/021562, dated Aug. 24, 2021.

*Primary Examiner* — Mollie Impink
(74) *Attorney, Agent, or Firm* — Sughrue Mion, PLLC

(57) ABSTRACT

Provided is a packing material that makes it possible to omit an exclusive part for installing a robot on a stand, and to reduce the number of parts of the robot. The packing material for packing the robot has a first support member that supports the robot in a state in which a base of the robot is exposed, and the first support member is provided with grip portions which are held by a worker to lift the robot together with the first support member.

2 Claims, 18 Drawing Sheets

(56) References Cited

FOREIGN PATENT DOCUMENTS

| | | | |
|---|---|---|---|
| JP | 2014-240294 | A | 12/2014 |
| JP | 2014-240295 | A | 12/2014 |
| JP | 2015-229517 | A | 12/2015 |

* cited by examiner

FIG. 1
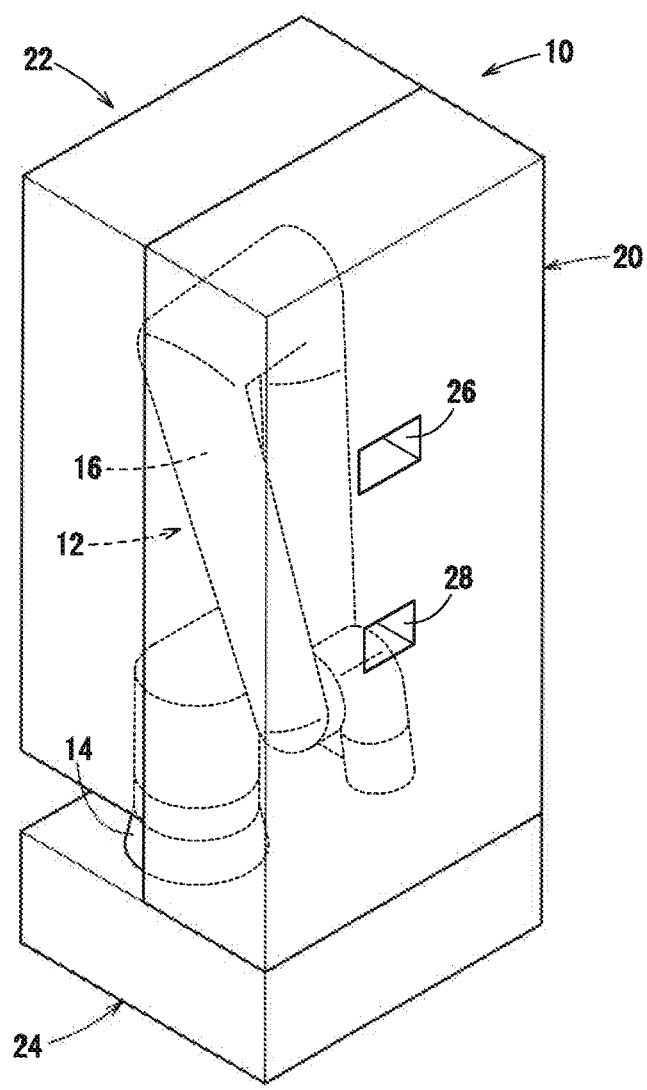
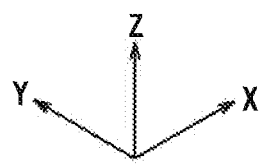

FIG. 6
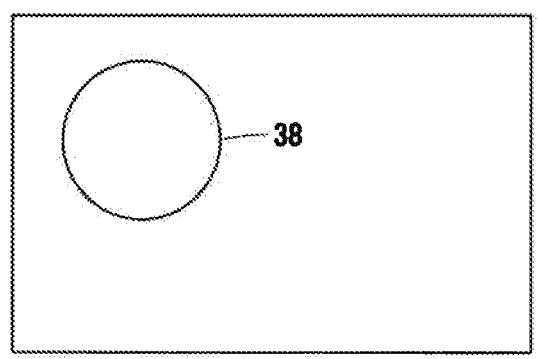
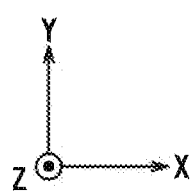

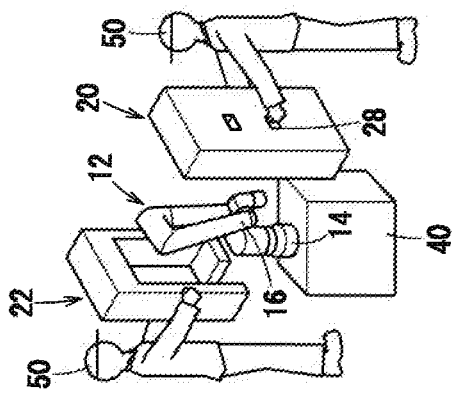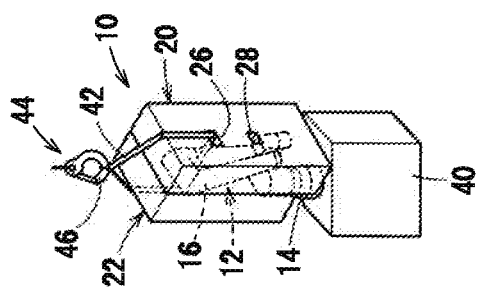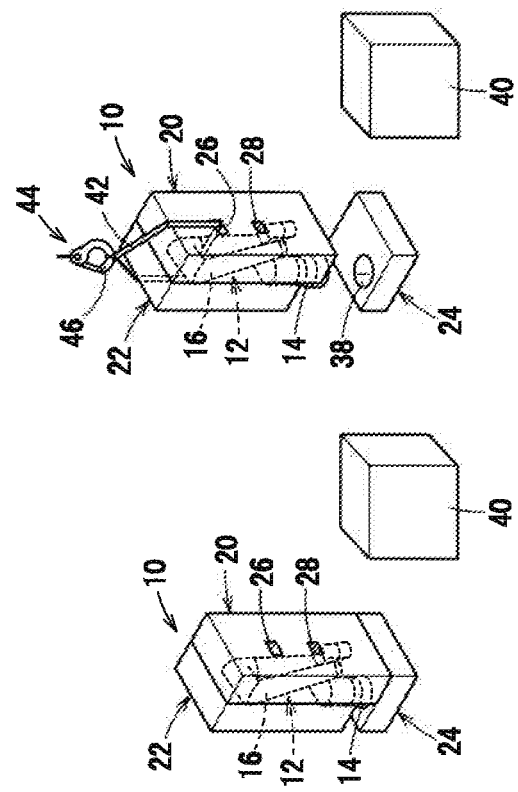

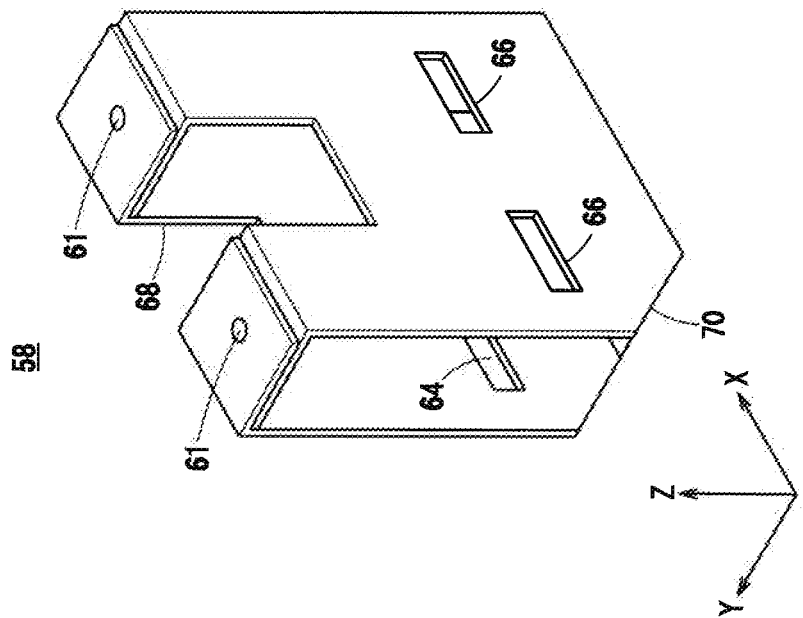
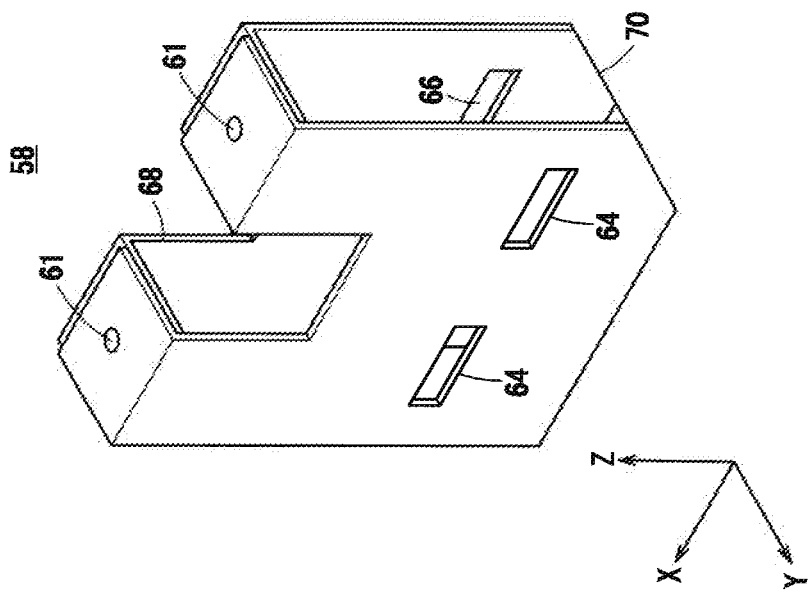

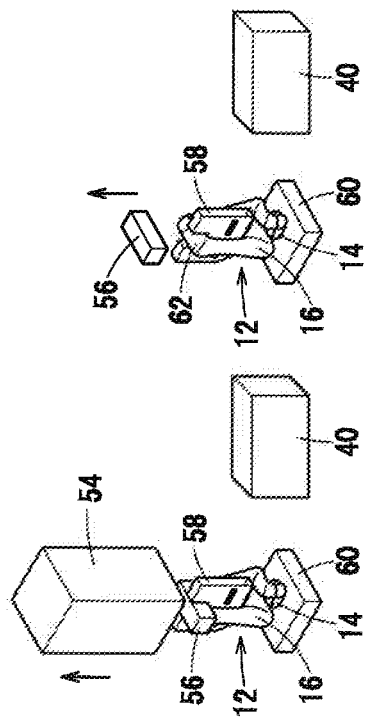

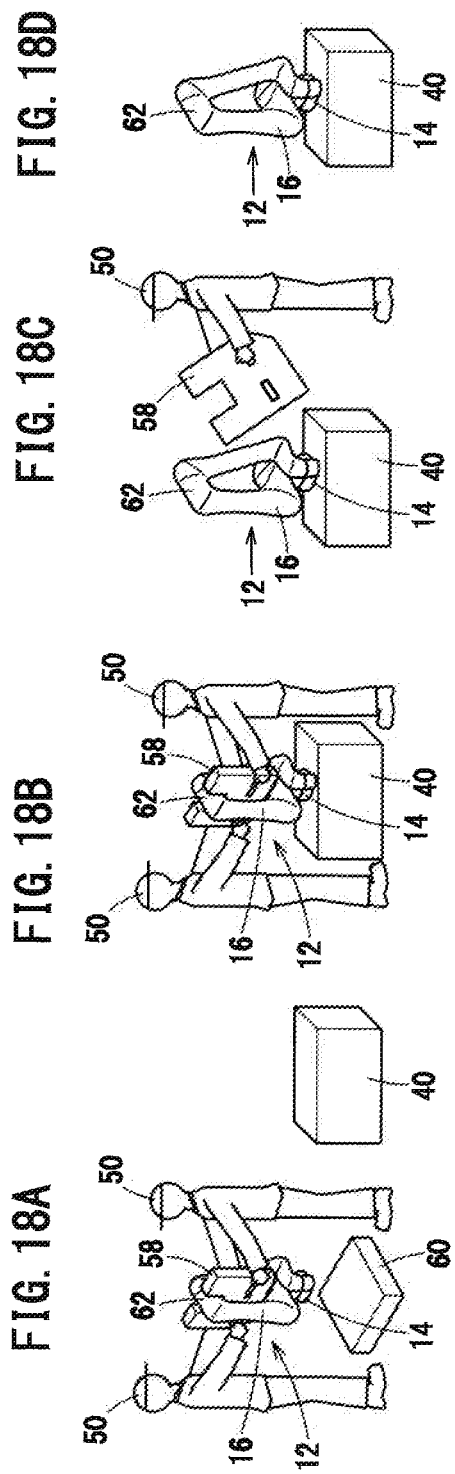

PACKING MATERIAL

TECHNICAL FIELD

The present invention relates to a packing material for packing a robot.

BACKGROUND ART

Conventionally, a packing material provided with a gripped portion that can be gripped by an operator or worker has been known (for example, JP 2015-229517 A). For example, a robot is packed by using the packing material.

SUMMARY OF THE INVENTION

When the robot is installed on a pedestal, it is necessary to unpack the robot. Accordingly, the robot needs to be provided with an attachment portion to which a lifting member of a lifting device for hoisting the robot is attached, or a gripped portion which an operator or worker grips for lifting the robot. Therefore, there is a problem of the increased number of parts or components for the robot.

The present invention has been made to solve the above problem, and an object of the present invention is to provide a packing material capable of reducing the number of parts or components of a robot by omitting a dedicated part or component for installing the robot on a pedestal.

According to an aspect of the present invention, there is provided a packing material for packing an articulated robot, the packing material including: a first support member configured to support the articulated robot in a state in which a base of the articulated robot is exposed; wherein the first support member includes an attachment portion to which an attachment member of a lifting device is attached in order for the lifting device to hoist the articulated robot together with the first support member, or a gripped portion configured to be gripped by an operator in order for the operator to lift the articulated robot together with the first support member.

According to the present invention, the number of parts or components of the robot can be reduced.

BRIEF DESCRIPTION OF DRAWINGS

FIG. 1 is a perspective view showing a packing material;
FIG. 6 is a view of a third packing member as viewed from a positive Z-axis direction side;
FIG. 8A is a diagram illustrating a procedure in which a robot is installed on a pedestal;
FIG. 8B is a diagram illustrating the procedure in which the robot is installed on the pedestal;
FIG. 8C is a diagram illustrating the procedure in which the robot is installed on the pedestal;
FIG. 8D is a diagram illustrating the procedure in which the robot is installed on the pedestal;
FIG. 14A is a perspective view of a fifth packing member;
FIG. 14B is a perspective view of the fifth packing member;
FIG. 17A is a diagram illustrating a procedure in which the robot is installed on a pedestal;
FIG. 17B is a diagram illustrating the procedure in which the robot is installed on the pedestal;
FIG. 17C is a diagram illustrating the procedure in which the robot is installed on the pedestal;
FIG. 17D is a diagram illustrating the procedure in which the robot is installed on the pedestal;
FIG. 18A is a diagram illustrating a procedure in which the robot is installed on the pedestal;
FIG. 18B is a diagram illustrating the procedure in which the robot is installed on the pedestal;
FIG. 18C is a diagram illustrating the procedure in which the robot is installed on the pedestal;
and
FIG. 18D is a diagram illustrating the procedure in which the robot is installed on the pedestal.

DETAILED DESCRIPTION OF THE INVENTION

First Embodiment

Figure 2:
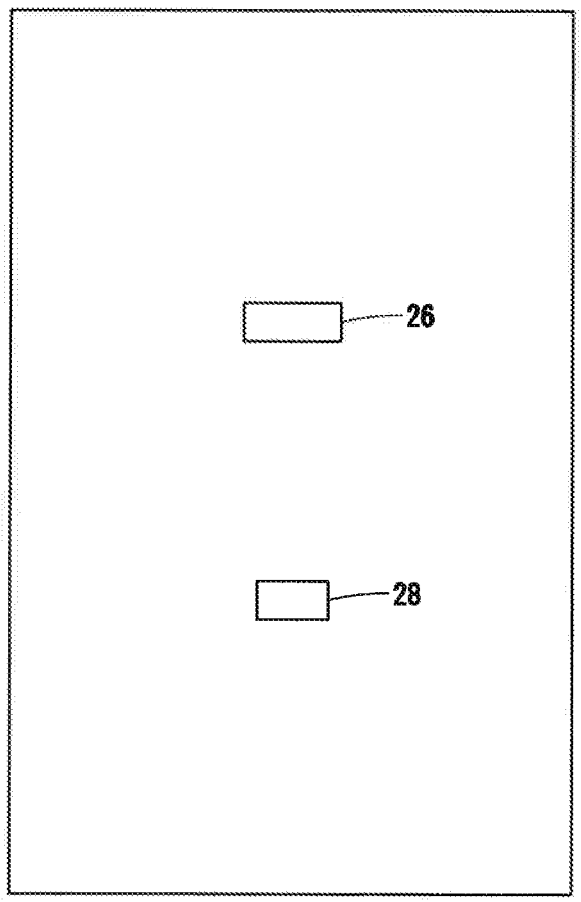
FIG. 2 is a view of a first packing member as viewed from a negative Y-axis direction side.

FIG. 1 is a perspective view showing a packing material 10. The packing material 10 packs a robot 12. In FIG. 1, the robot 12 packed in the packing material 10 is indicated by dotted lines. The robot 12 is an articulated robot, and includes a base 14 and a manipulator 16. When the robot 12 is packed in the packing material 10, the robot 12 is disposed in a predetermined packing posture. Hereinafter, in the present embodiment, directions will be described based on X, Y, and Z coordinate axes shown in FIG. 1. In also the drawings other than FIG. 1, coordinate axes corresponding to the coordinate axes in FIG. 1 may be described.

The packing material 10 is formed of corrugated cardboard or foaming agent. The packing material 10 has strength enough to sufficiently receive the load of the robot 12. The packing material 10 includes a first packing member 20, a second packing member 22, and a third packing member 24. The first packing member 20 is attached to the robot 12 from the negative Y-axis direction side of the robot 12. The second packing member 22 is attached to the robot 12 from the positive Y-axis direction side of the robot 12. In a state where the first packing member 20 and the second packing member 22 are attached to the robot 12, the base 14 of the robot 12 is exposed to the outside. The third packing member 24 is attached to the robot 12 from the negative side in the Z-axis direction, and covers the base 14 of the robot 12. The first packing member 20 and the second packing member 22 correspond to a first support member of the present invention, and the third packing member 24 corresponds to a second support member of the present invention.

Figure 3:
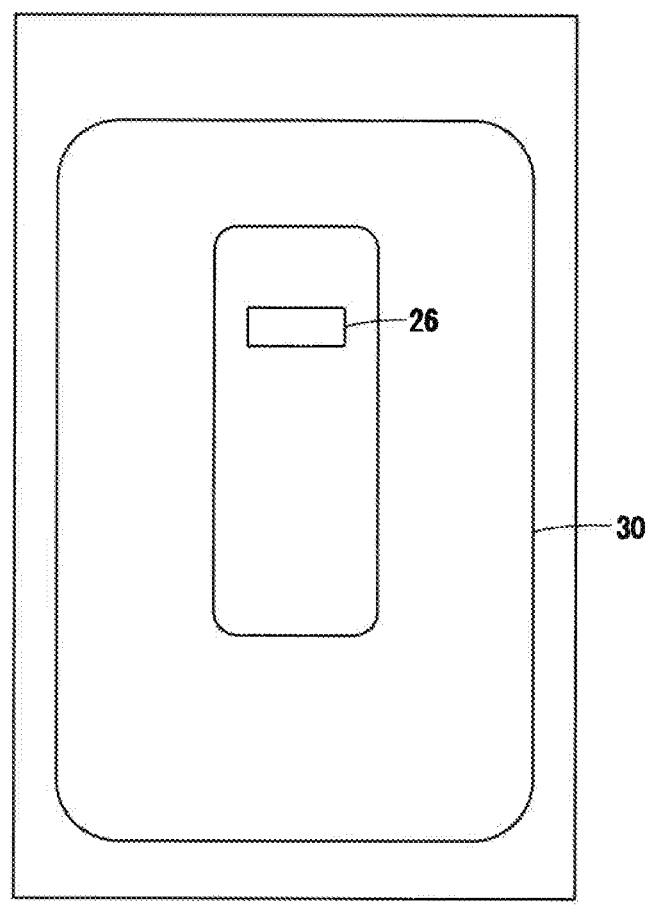
FIG. 3 is a view of the first packing member as viewed from the positive Y-axis direction side.

FIG. 2 is a view of the first packing member 20 as viewed from the negative Y-axis direction side. FIG. 3 is a view of the first packing member 20 as viewed from the positive Y-axis direction side. The first packing member 20 has an attachment portion 26. The attachment portion 26 is formed as a through hole penetrating in the Y-axis direction. On a surface of the first packing member 20 that lies on the negative side in the Y-axis direction, a gripped portion 28 formed as a recess is provided. On a surface of the first packing member 20 that lies on the positive side in the Y-axis direction, an accommodation portion 30 formed as a recess is provided. The accommodation portion 30 is formed so as to conform to an outer shape of the robot 12 disposed in the packing posture as viewed from the negative side in the Y-axis direction.

Figure 4:
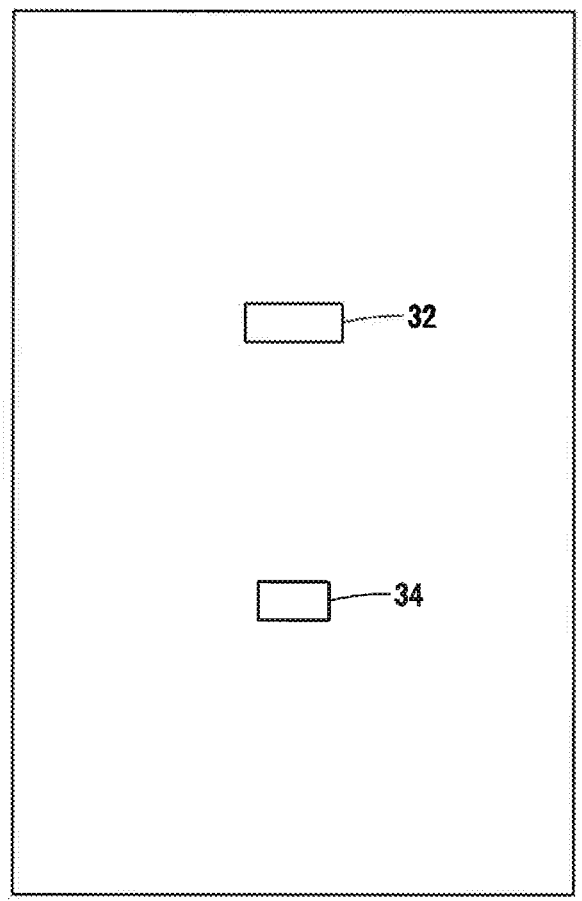
FIG. 4 is a view of a second packing member as viewed from the positive Y-axis direction side.
Figure 5:
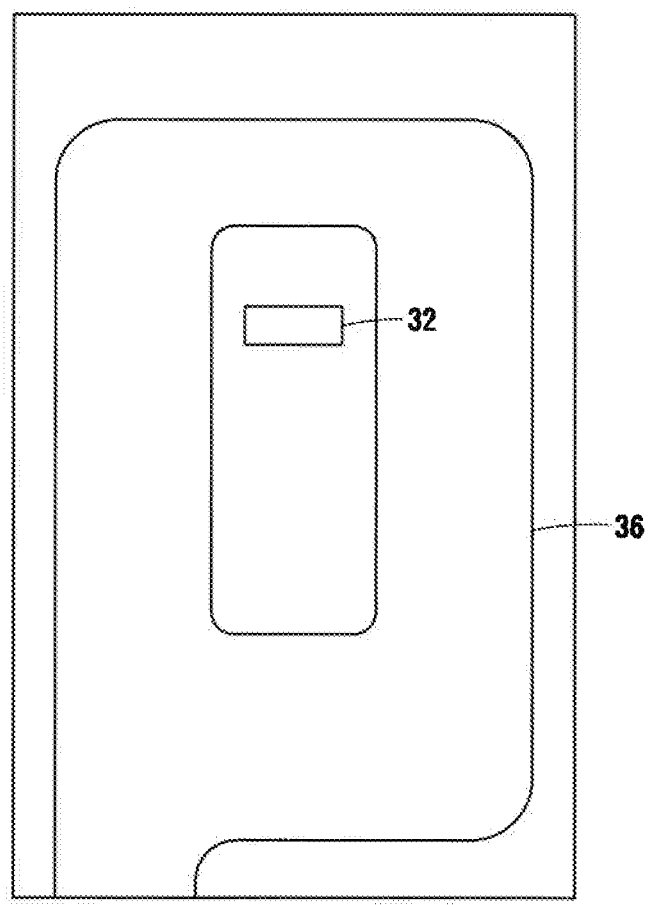
FIG. 5 is a view of the second packing member as viewed from the negative Y-axis direction side.

FIG. 4 is a view of the second packing member 22 as viewed from the positive Y-axis direction side. FIG. 5 is a view of the second packing member 22 as viewed from the negative Y-axis direction side. The second packing member 22 has an attachment portion 32. The attachment portion 32 is formed as a through hole penetrating in the Y-axis direction. In a state where the first packing member 20 and the second packing member 22 are attached to the robot 12, the attachment portion 26 of the first packing member 20 and the attachment portion 32 of the second packing member 22 communicate with each other. A surface of the second packing member 22 that lies on the positive side in the Y-axis direction is provided with a gripped portion 34 formed as a recess. An accommodation portion 36 formed as a recess is provided on a surface of the second packing member 22 that lies on the negative side in the Y-axis direction. The accommodation portion 36 is formed so as to conform to an outer shape of the robot 12 disposed in the packing posture as viewed from the positive side in the Y-axis direction.

In a state where the first packing member 20 and the second packing member 22 are attached to the robot 12, the surface of the first packing member 20 on which the accommodation portion 30 is formed and the surface of the second packing member 22 on which the accommodation portion 36 is formed are joined to each other. An adhesive may be applied to each of the joined surfaces of the first packing member 20 and the second packing member 22 in order to firmly bond the joined surfaces to each other. In addition, an engagement portion that enables engagement of the first packing member 20 and the second packing member 22 with each other may be provided on each of the joined surfaces of the first packing member 20 and the second packing member 22. In addition, the first packing member 20 and the second packing member 22 may be fixed to each other by an adhesive tape.

In a state in which the first packing member 20 and the second packing member 22 are joined to each other, a space formed by the accommodation portion 30 and the accommodation portion 36 has a shape substantially equal to the shape of the manipulator 16 of the robot 12 placed in the packing posture. That is, the robot 12 is sandwiched between the first packing member 20 and the second packing member 22. Thus, the robot 12 can be moved together with the first packing member 20 and the second packing member 22.

Figure 7:
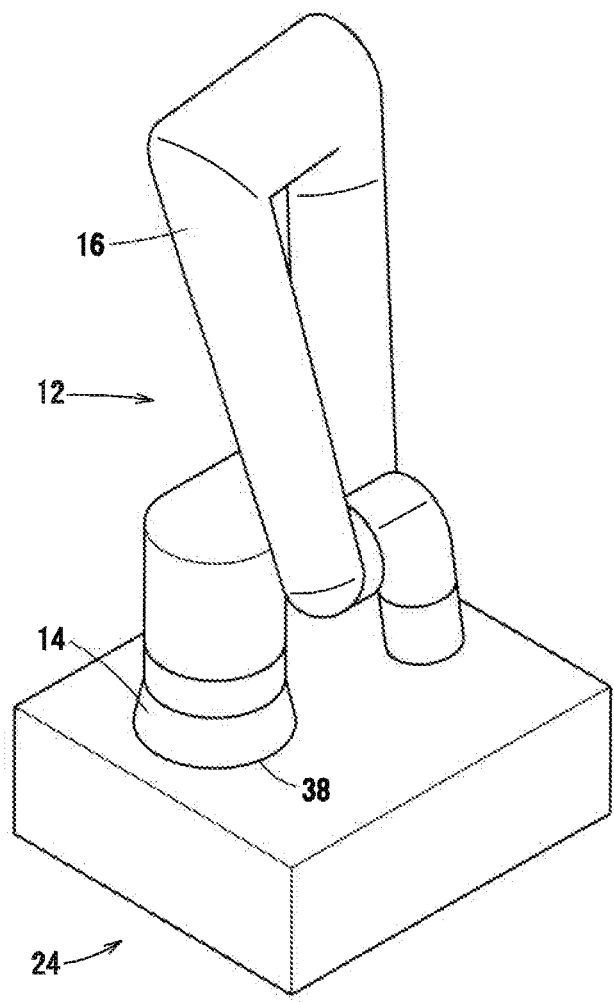
FIG. 7 is a view showing a state in which the third packing member is attached to the robot.

FIG. 6 is a view of the third packing member 24 as viewed from the positive Z-axis direction side. FIG. 7 is a view showing a state in which the third packing member 24 is attached to the robot 12. A surface of the third packing member 24 that lies on the positive side in the Z-axis direction is provided with an accommodation portion 38 that is formed as a recess having a shape conforming to the shape of a portion of the base 14 that lies on the negative side in the Z-axis direction. The accommodation portion 38 is formed so as to have a shape that enables the robot 12 to stand by itself on the accommodation portion 38 in a state in which the base 14 of the robot 12 is placed from the positive Z-axis direction side. Accordingly, as shown in FIG. 7, the robot 12 can stand by itself in a state in which the base 14 is placed in the accommodation portion 38.

Figure 9:
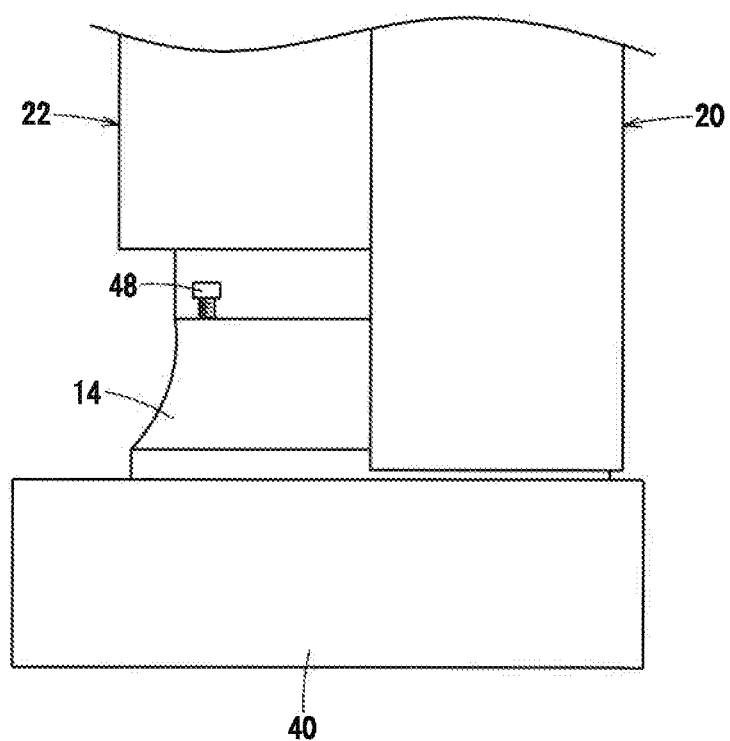
FIG. 9 is an enlarged view of a base and its vicinity the when the robot is installed on the pedestal.

FIGS. 8A, 8B, 8C, and 8D are diagrams illustrating a procedure in which the robot 12 is installed on a pedestal 40. FIG. 9 is an enlarged view of the base 14 and its vicinity when the robot 12 is installed on the pedestal 40.

As shown in FIG. 8A, an operation of unpacking the packing material 10 is performed near the pedestal 40 on which to install the robot 12. As shown in FIG. 8B, a sling 42 is passed through the attachment portions 26, 32 and hung on a hook 46 of a crane 44. Thereafter, the robot 12 is hoisted together with the first packing member 20 and the second packing member 22 by the crane 44. At this time, the third packing member 24 is detached from the base 14 of the robot 12 and remains on the ground. Since the robot 12 is held by the accommodation portion 30 of the first packing member 20 and the accommodation portion 36 of the second packing member 22, the robot 12 does not fall even when the third packing member 24 is detached from the base 14. The crane 44 corresponds to a lifting device of the present invention, and the sling 42 corresponds to an attachment member of the present invention.

As shown in FIG. 8C, the robot 12 is installed on the pedestal 40 by the crane 44 with the first packing member 20 and the second packing member 22 being attached thereto. As shown in FIG. 9, in a state where the first packing member 20 and the second packing member 22 are attached to the robot 12, the base 14 is exposed to the outside. Therefore, in this state, an operator or worker 50 can fix the base 14 to the pedestal 40 with bolts 48. If the base 14 is fixed to the pedestal 40 with at least one bolt 48, the robot 12 can be prevented from falling down. As shown in FIG. 8D, the operator 50 removes the first packing member 20 and the second packing member 22 from the robot 12. Thus, the installation of the robot 12 on the pedestal 40 is completed. Since the base 14 is fixed to the pedestal 40 with the bolts 48, the robot 12 is prevented from falling down when the operator 50 removes the first packing member 20 and the second packing member 22 from the robot 12.

The procedure in which the robot 12 is hoisted by the crane 44 and the robot 12 is installed on the pedestal 40 has been described above. However, the robot 12 may be lifted by the operators 50, and the robot 12 may be installed on the pedestal 40. FIGS. 10A, 10B, 10C, and 10D are diagrams illustrating a procedure in which the robot 12 is installed on the pedestal 40.

Figure 10:
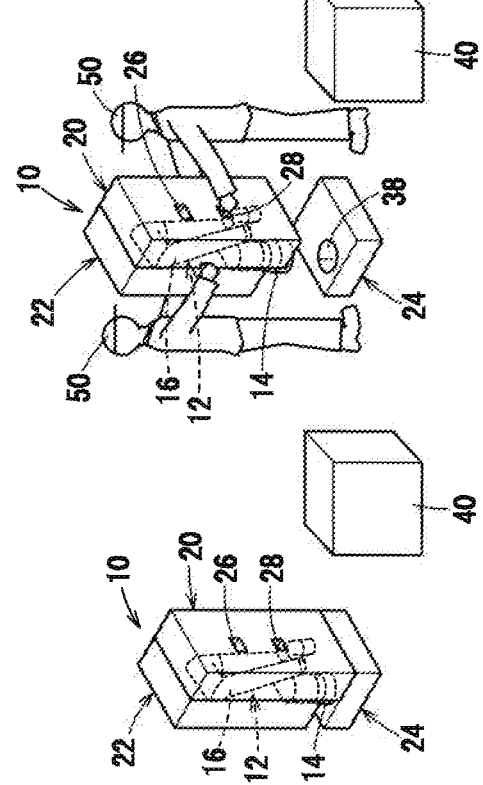
FIG. 10A is a diagram illustrating a procedure in which a robot is installed on a pedestal.
FIG. 10B is a diagram illustrating the procedure in which the robot is installed on the pedestal.
FIG. 10C is a diagram illustrating the procedure in which the robot is installed on the pedestal.
FIG. 10D is a diagram illustrating the procedure in which the robot is installed on the pedestal.

As shown in FIG. 10A, the operation of unpacking the packing material 10 is performed near the pedestal 40 on which the robot 12 is installed. As shown in FIG. 10B, the gripped portions 28 and 34 are gripped by two operators 50, and the robot 12 is lifted together with the first packing member 20 and the second packing member 22. At this time, the third packing member 24 is detached from the base 14 of the robot 12 and remains on the ground.

As shown in FIG. 10C, the operators 50 install the robot 12 on the pedestal 40 with the first packing member 20 and the second packing member 22 remaining attached thereto. The base 14 is exposed to the outside in a state where the first packing member 20 and the second packing member 22 are attached to the robot 12. Therefore, in this state, the operators 50 can fix the base 14 to the pedestal 40 with the bolts 48. As shown in FIG. 10D, the operators 50 remove the first packing member 20 and the second packing member 22 from the robot 12. Thus, the installation of the robot 12 on the pedestal 40 is completed.

Operation and Effect

Conventionally, the robot 12 is first unpacked and then installed on the pedestal 40. Therefore, it is necessary to provide the robot 12 with an attachment portion to which the sling 42 of the crane 44 is attached or a gripped portion which is gripped by the operator 50. However, the attachment portion or the gripped portion is not needed except when moving the robot 12. Accordingly, in a case where infrequently used components or parts are provided in the robot 12, the number of components or parts of the robot 12 increases, and the number of assembly steps of the robot 12 increases.

In order to address the above, the packing material 10 of the present embodiment includes the first packing member 20 having the accommodation portion 30 configured to accommodate the robot 12 therein and the second packing member 22 having the accommodation portion 36 configured to accommodate the robot 12 therein. The base 14 of the robot 12 is exposed to the outside in a state where the robot 12 is accommodated in the first packing member 20 and the second packing member 22. The first packing member 20 includes the attachment portion 26 and the gripped portion 28. Similarly, the second packing member 22 includes the attachment portion 32 and the gripped portion 34.

Accordingly, the attachment portion 26 and the gripped portion 28 are provided on the first packing member 20, and the attachment portion 32 and the gripped portion 34 are provided on the second packing member 22. Thus, there is no need to provide an attachment portion or a gripped portion on the robot 12. Therefore, the number of components or parts of the robot 12 can be reduced, and the assembly person-hours of the robot 12 can be reduced accordingly.

The packing material 10 according to the present embodiment includes the third packing member 24 that covers the base 14 of the robot 12. The third packing member 24 is formed so as to be detached from the base 14 when the first packing member 20 and the second packing member 22 accommodating the robot 12 are hoisted with the crane 44 or lifted by the operators 50.

Thus, the base 14 can be protected with the third packing member 24 during transportation of the robot 12. When the robot 12 is installed on the pedestal 40, the third packing member 24 is detached from the base 14, and the base 14 is exposed to the outside. Therefore, the robot 12 can be installed on the pedestal 40 in a state where the first packing member 20 and the second packing member 22 are attached to the robot 12.

In the packing material 10 of the present embodiment, the third packing member 24 is formed so as to have a shape that allows the robot 12 placed on the third packing member 24 to stand by itself. Accordingly, the robot 12 can stably stand by itself in a state in which the robot 12 is packed in the packing material 10.

In the above description, the first packing member 20 and the second packing member 22 are hoisted with the crane 44, but may be hoisted with a robot different from the robot 12.

Second Embodiment

Figure 11:
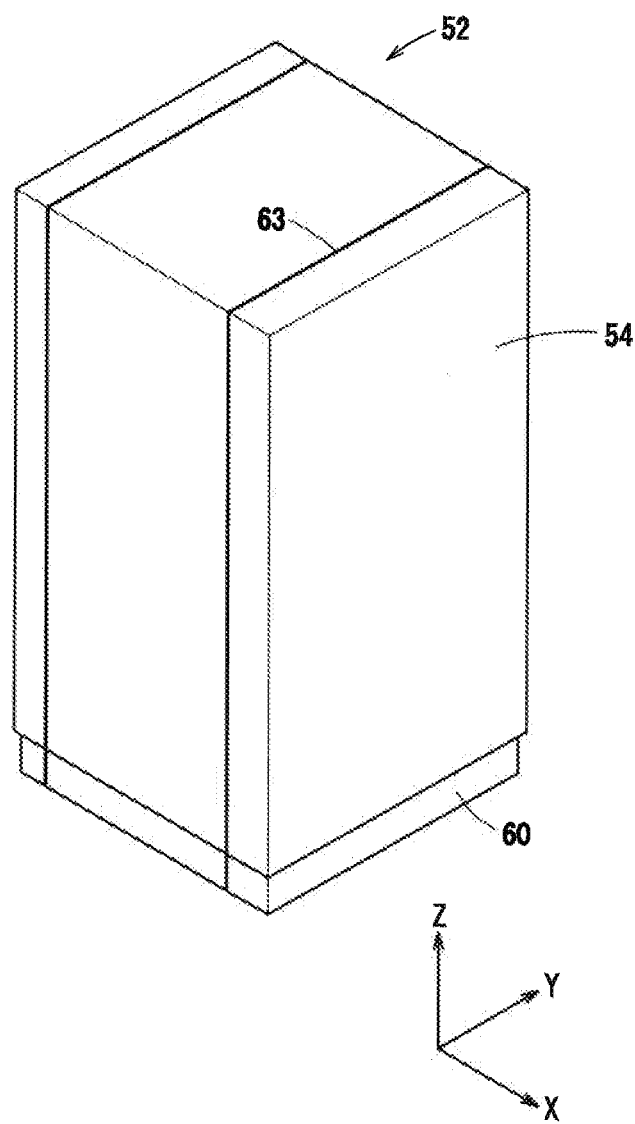
FIG. 11 is a perspective view showing a packing material.
Figure 12:
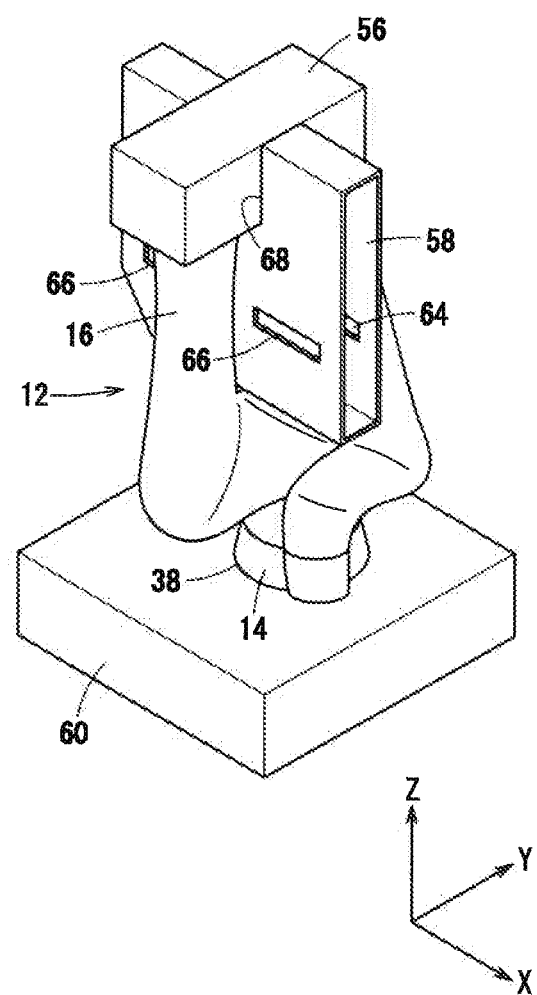
FIG. 12 is a perspective view showing a state in which an outer box of the packing material is removed.
Figure 13:
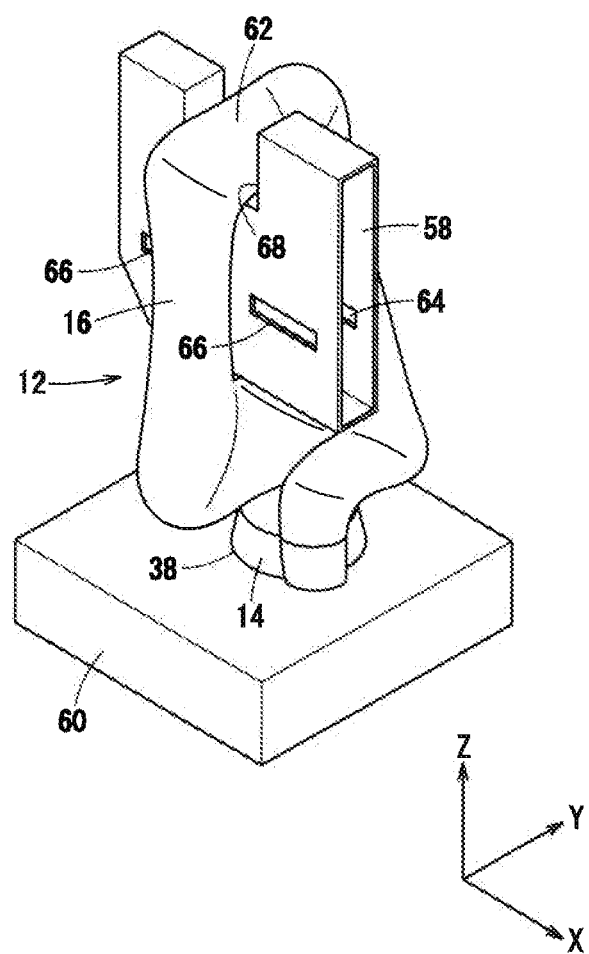
FIG. 13 is a perspective view showing a state in which the outer box and a fourth packing member of the packing material are removed.

FIG. 11 is a perspective view showing a packing material 52. FIG. 12 is a perspective view of the packing material 52 from which an outer box 54 is removed. FIG. 13 is a perspective view of the packing material 52 from which the outer box 54 and a fourth packing member 56 are removed. The packing material 52 of the present embodiment packs the robot 12 similarly to the packing material 10 of the first embodiment.

The packing material 52 is formed of corrugated cardboard. The packing material 52 has strength enough to sufficiently receive the load of the robot 12. The packing material 52 includes an outer box 54, a fourth packing member 56, a fifth packing member 58, and a sixth packing member 60.

As shown in FIG. 11, the robot 12 is entirely covered with the outer box 54 and the sixth packing member 60. Hereinafter, in the present embodiment, the structure of the packing material 52 will be described based on a state in which the packing material 52 is placed such that the sixth packing member 60 is in contact with the ground. In the present embodiment, directions are described based on X, Y, and Z coordinate axes shown in FIG. 11. In also the drawings other than FIG. 11, coordinate axes corresponding to the coordinate axes in FIG. 11 may be described. The X-axis direction and the Y-axis direction are directions parallel to the horizontal direction (i.e., directions orthogonal to the direction of gravity). A Z-axis direction is an up-down direction (a direction parallel to the gravity direction), the positive side in the Z-axis direction indicates the upper side, and the negative side in the Z-axis direction indicates the lower side.

The robot 12 is an articulated robot, and includes a base 14 and a manipulator 16. When the robot 12 is packed in the packing material 52, the robot 12 is disposed in a packing posture as shown in FIGS. 12 and 13. The manipulator 16 has a plurality of links. In the state in which the robot 12 is disposed in the packing posture, the axial direction of one link 62 located at the uppermost position among the plurality of links substantially coincides with the Y-axis direction. The link 62 corresponds to one link of the present invention.

The outer box 54 is formed into a box shape having an opening on the negative side in the Z-axis direction, and covers the robot 12 from the positive side in the Z-axis direction to accommodate the robot 12 there inside. The fourth packing member 56 is formed into a box shape having an opening on the negative side in the Z-axis direction, and is attached to the robot 12 while covering the link 62 from the positive side in the Z-axis direction side. The fifth packing member 58 is inserted between the link 62 and the base 14 and attached to the robot 12. When viewed from the positive side in the Z-axis direction, the fourth packing member 56 is disposed to extend in the Y-axis direction, and the fifth packing member 58 is disposed to extend in the X-axis direction. The fourth packing member 56 and the fifth packing member 58 are housed inside the outer box 54 together with the robot 12 in a state of being attached to the robot 12. The fifth packing member 58 corresponds to a first support member of the present invention.

The fourth packing member 56 is in contact with the inner peripheral surface of the outer box 54 or faces the inner peripheral surface of the outer box 54 with a slight gap therebetween, in a state of being accommodated inside the outer box 54. Thus, the robot 12 is prevented from falling down in the Y-axis direction. Further, the fifth packing member 58 is in contact with the inner peripheral surface of the outer box 54 or faces the inner peripheral surface of the outer box 54 with a slight gap therebetween, in a state of being accommodated inside the outer box 54. Thus, the robot 12 is prevented from falling down in the X-axis direction. The sixth packing member 60 is attached to the robot 12 from the negative side in the Z-axis direction, and covers the base 14 of the robot 12. The shape of the sixth packing member 60 is the same as the shape of the third packing member 24 of the first embodiment.

Figure 15:
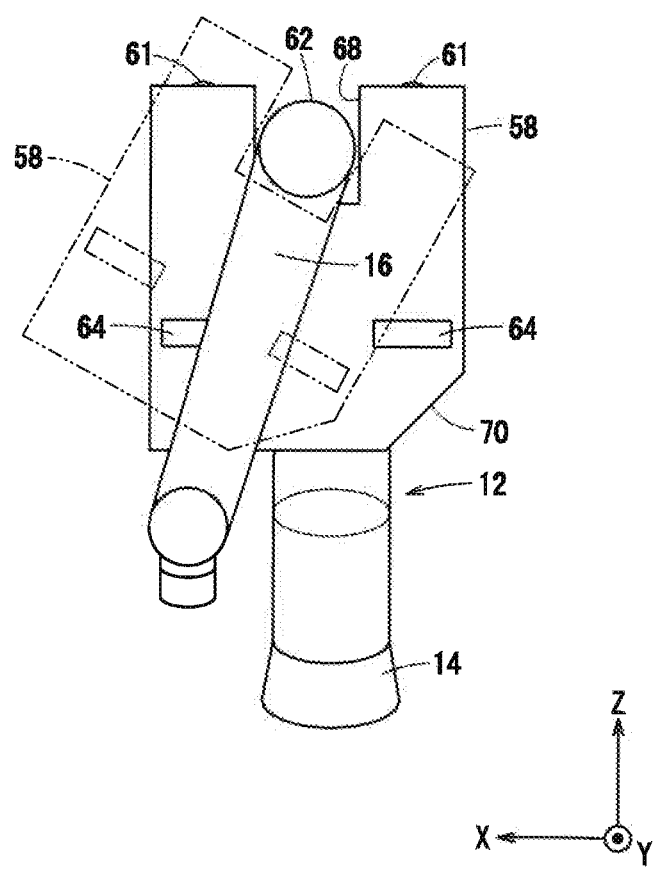
FIG. 15 is a diagram illustrating how the fifth packing member is attached to a robot.

FIGS. 14A and 14B are perspective views of the fifth packing member 58. FIG. 15 is a view showing how the fifth packing member 58 is attached to the robot 12, as viewed from the positive Y-axis direction side. At this time, the robot 12 is in the packing posture, and the axial direction of the link 62 substantially coincides with the Y-axis direction.

As shown in FIGS. 14A and 14B, the fifth packing member 58 is formed by bending or folding a single plate-shaped corrugated cardboard so as to have a hollow portion thereinside. Both end portions of the folded or bent corrugated cardboard are fixed to each other at two places with fasteners 61. The fasteners 61 are exposed to the outside on an upper surface (surface on the positive side in the Z-axis direction) of the fifth packing member 58. The upper surface of the fifth packing member 58 is not in contact with the robot 12 in a state where the fifth packing member 58 is attached to the robot 12. By arranging the fasteners 61 on the upper surface of the fifth packing member 58, damage to the robot 12 can be prevented.

Gripped portions 64 and gripped portion 66 that penetrate through the corrugated cardboard are formed respectively on a surface of the fifth packing member 58 that lies on the positive Y-axis direction side and another surface thereof that lies on the negative Y-axis direction side.

The fifth packing member 58 is formed with an insertion portion 68 formed so as to be recessed from a surface thereof that lies on the positive Z-axis direction side. When the fifth packing member 58 is attached to the robot 12, the link 62 is inserted into the insertion portion 68. The insertion portion 68 is formed such that the length (depth) in the Z-axis direction is sufficiently larger than the diameter of the link 62. As a result, in a state in which the fifth packing member 58 is attached to the robot 12, the link 62 inserted into the insertion portion 68 is positioned on the negative Z-axis direction side relative to the surface on the positive Z-axis direction side of the fifth packing member 58. The length in the X-axis direction (i.e., width) of the insertion portion 68 is slightly larger than the diameter of the link 62. Accordingly, when the fifth packing member 58 is attached to the robot 12, the link 62 can be easily inserted into the insertion portion 68. Further, in a state where the fifth packing member 58 is accommodated inside the outer box 54 together with the robot 12, it is possible to suppress rattling of the robot 12 in the X-axis direction.

As shown in FIG. 15, the fifth packing member 58 has an inclined portion 70 which is inclined with respect to the gravity direction (Z-axis direction) so as to extend from the side surface to the lower surface of the fifth packing member 58. For attaching the fifth packing member 58 to the robot 12, as indicated by a dotted line in FIG. 15, the link 62 is inserted into the insertion portion 68 from a direction oblique to the Z-axis direction. Then, the fifth packing member 58 is rotated around the link 62 as an axis to attach the fifth packing member 58 to the robot 12. When the fifth packing member 58 rotates about the link 62, the presence of the inclined portion 70 can avoid interference of the fifth packing member 58 with the surface of the base 14 on the positive Z-axis direction side. Therefore, it is possible to leave enough distance between the bottom surface (surface on the negative side in the Z-axis direction) of the insertion portion 68 and the lower surface (surface on the negative side in the Z-axis direction) of the fifth packing member 58. Accordingly, it is possible to suppress rattling of the fifth packing member 58 in the Z-axis direction with respect to the robot 12.

As shown in FIG. 15, the length in the X-axis direction (width) of the fifth packing member 58 is longer than the length in the X-axis direction (width) of the robot 12 in the packing posture. Owing thereto, when a force in the X-axis direction acts on the packing material 52, the fifth packing member 58 receives the force earlier than the robot 12 does, and thus it is possible to prevent damage to the robot 12.

Figure 16:
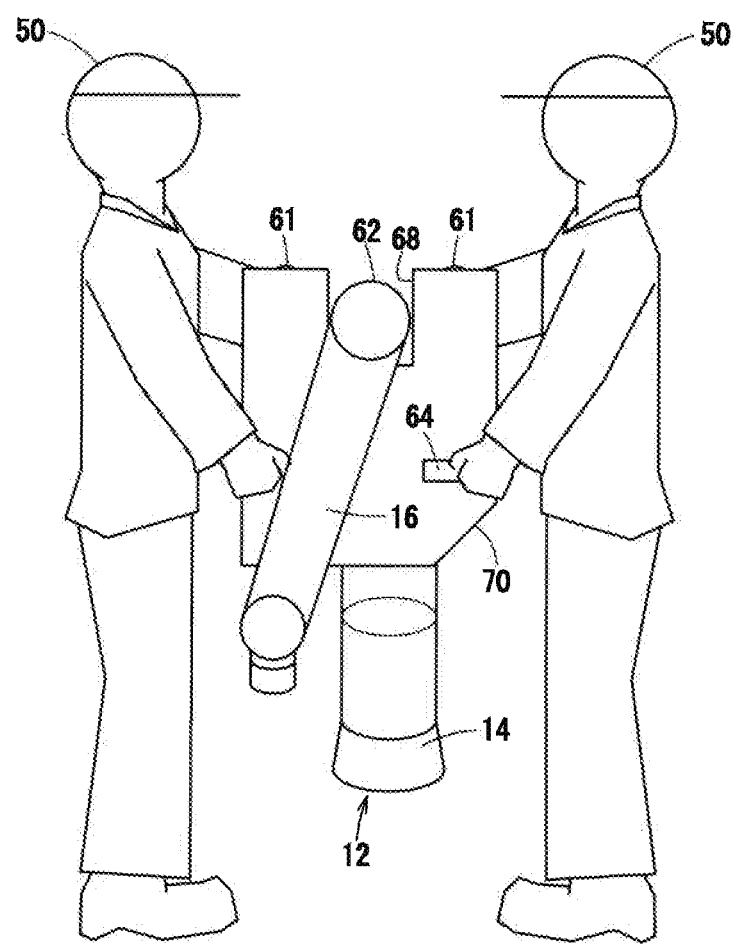
FIG. 16 is a diagram showing a state in which the robot is lifted by operators.

FIG. 16 is a diagram illustrating a state in which the robot 12 is lifted by the operators 50. The robot 12 is lifted by two operators 50. The operators 50 grip the gripped portions 64 and 66 of the fifth packing member 58 and lift the fifth packing member 58. At this time, the bottom surface (surface on the negative side in the Z-axis direction) of the insertion portion 68 supports the link 62 from below, and the robot 12 is lifted together with the fifth packing member 58.

FIGS. 17A, 17B, 17C, and 17D and FIGS. 18A, 18B, 18C, and 18D are diagrams illustrating a procedure in which the robot 12 is installed on the pedestal 40.

As shown in FIG. 17A, the packing material 52 is put in the vicinity of the pedestal 40 on which to install the robot 12, in a state of being laid on its side. First, as shown in FIG. 17B, the packing material 52 is raised such that the outer box 54 is positioned upward, and packing bands 63 wound around the outer box 54 and the sixth packing member 60 are removed.

Thereafter, as shown in FIG. 17C, the outer box 54 is lifted upward, and the robot 12 is taken out from the outer box 54. Thereafter, as shown in FIG. 17D, the fourth packing member 56 attached to the link 62 of the robot 12 is removed.

As shown in FIG. 18A, the gripped portions 64 and 66 of the fifth packing member 58 are gripped by the operators 50, and the robot 12 is lifted together with the fifth packing member 58. At this time, the sixth packing member 60 is detached from the base 14 of the robot 12 and remains on the ground.

As shown in FIG. 18B, the robot 12 with the fifth packing member 58 remaining attached thereto is installed on the pedestal 40 by the operators 50. Since the base 14 is exposed to the outside in a state where the fifth packing member 58 is attached to the robot 12, in this state, the base 14 can be fixed to the pedestal 40 with the bolts 48.

As shown in FIG. 18C, the operator 50 removes the fifth packing member 58 from the robot 12. Thus, as shown in FIG. 18D, the installation of the robot 12 on the pedestal 40 is completed.

Operation and Effect

In the packing material 52 of the present embodiment, the fifth packing member 58 is inserted between the link 62 of the robot 12 and the base 14. Accordingly, when the operators 50 grip the gripped portions 64 and 66 of the fifth packing member 58 and lift the fifth packing member 58, the robot 12 can be lifted in a state in which the fifth packing member 58 supports the link 62 from below.

In the packing material 52 of the present embodiment, when the robot 12 with the fifth packing member 58 attached thereto is viewed from the axial direction of the link 62, the width of the fifth packing member 58 is larger than the width of the robot 12 in the packing posture. Accordingly, when a force in the widthwise direction acts on the packing material 52, the fifth packing member 58 receives the force earlier than the robot 12, and thus it is possible to suppress damage to the robot 12.

Further, in the packing material 52 of the present embodiment, the fifth packing member 58 has the insertion portion 68 which is formed so as to be recessed from the upper surface and into which the link 62 is inserted. Accordingly, the fifth packing member 58 can support the link 62 in a state in which movement of the link 62 relative to the fifth packing member 58 is restricted.

In the packing material 52 of the present embodiment, the insertion portion 68 of the fifth packing member 58 is formed such that the length in the depth direction is larger than the diameter of the link 62, Accordingly, in a state in which the fifth packing member 58 is attached to the robot 12, the link 62 inserted into the insertion portion 68 can be positioned below the upper surface of the fifth packing member 58. When a force acts on the upper surface of the outer box 54 in a state in which the robot 12 is packed in the packing material 52, the fifth packing member 58 receives the force earlier than the robot 12, so that damage to the robot 12 can be prevented.

In the packing material 52 of the present embodiment, when viewed in the axial direction of the link 62, the fifth packing member 58 has the inclined portion 70 that is inclined with respect to the gravity direction so as to extend from the side surface to the lower surface. When the fifth packing member 58 is attached to the robot 12, the provision of the inclined portion 70 can avoid interference of the fifth packing member 58 with the upper surface of the base 14. Therefore, it is possible to leave enough distance between the bottom surface of the insertion portion 68 and the lower surface of the fifth packing member 58, and it is possible to suppress rattling of the fifth packing member 58 relative to the robot 12 in the up-down direction.

Technical Concepts Obtainable from the Embodiments

The following is a description of technical concepts that can be understood from the embodiments described above.

The packing material (10, 52) for packing the articulated robot (12), includes the first support member (20, 22, 58) configured to support the articulated robot in a state where the base (14) of the articulated robot is exposed. The first support member includes the attachment portion (26) to which the attachment member (42) of the lifting device (44) is attached in order for the lifting device to hoist the articulated robot together with the first support member, or the gripped portion (28, 34, 64, 66) configured to be gripped by the operator (50) in order for the operator to lift the articulated robot together with the first support member.

In the packing material, the packing material may pack the articulated robot in a state in which the articulated robot is disposed in the packing posture in which the one link (62) among the plurality of links of the manipulator (16) of the articulated robot is positioned above the base and the axial direction of the one link substantially coincides with a direction orthogonal to the gravity direction, and the first support member may be inserted between the one link and the base.

In the packing material, when viewed in the axial direction of the one link, the width of the first support member may be formed to be larger than the width of the articulated robot in the packing posture.

In the above-described packing material, the first support member may include the insertion portion (68) into which the one link is inserted, the insertion portion (68) being formed by recessing the upper surface of the first support member.

In the above packing material, the insertion portion may be formed such that the length in the depth direction is larger than the diameter of the one link.

In the above packing material, when viewed in the axial direction of the one link, the first support member may include the inclined portion (70) formed to be inclined with respect to the gravity direction so as to extend from a side surface of the first support member to a lower surface thereof.

In the above-described packing material, the first support member may include the accommodation portion (30, 36) configured to accommodate the articulated robot therein.

The packing material may further include a second support member (24, 60) configured to support the articulated robot in a state of covering the base, and the second support member may be formed into a shape that enables the second support member to be detached from the base when the first support member is hoisted together with the articulated robot or when the first support member is lifted together with the articulated robot.

In the packing material, the second support member may be formed into a shape that supports the articulated robot so as to enable the articulated robot to stand by itself.

The invention claimed is:

1. A packing material for packing an articulated robot including a base and a manipulator provided on the base, the packing material comprising:
   a first packing member configured to accommodate part of the manipulator; and
   a second packing member configured to accommodate another part of the manipulator,
   wherein
   the first packing member includes
      a first accommodation portion that is a recess formed on one surface of the first packing member,
      a first attachment portion that is a hole penetrating the first packing member from the one surface formed with the first accommodation portion toward a surface opposite to the one surface, and
      a first gripped portion that is a hole or a recess formed on the surface opposite to the one surface formed with the first accommodation portion,
   the second packing member includes
      a second accommodation portion that is a recess formed on one surface of the second packing member,
      a second attachment portion that is a hole being formed at a position corresponding to the first attachment portion and penetrating the second packing member from the one surface formed with the second accommodation portion toward a surface opposite to the one surface, and
      a second gripped portion that is a hole or recess formed on a surface opposite to the surface formed with the second accommodation portion, the manipulator is inserted into the first accommodation portion, and the first accommodation portion covers part of an outer circumferential surface of the manipulator, the manipulator is inserted into the second accommodation portion, and the second accommodation portion covers part of the outer circumferential surface of the manipulator not covered by the first accommodation portion, the second accommodation portion is also formed on a lower surface of the second packing member and includes an opening that allows the base of the articulated robot to protrude downward from the second packing member, and a height of the second packing member is shorter than a height of the first packing member.

2. The packing material according to claim 1, further comprising a third packing member that includes a third accommodation portion configured to accommodate the base, wherein the third packing member is detached from the base in a case where the first packing member and the second packing member are hoisted together with the articulated robot or in a case where the first packing member and the second packing member are lifted together with the articulated robot.

* * * * *